(No Model.)

J. R. LITTLE.
MECHANISM FOR THE MANUFACTURE OF METAL WHEELS.

No. 334,254. Patented Jan. 12, 1886.

Witnesses:
Chas. J. Williamson.
Henry C. Hazard.

Inventor:
Jas. R. Little, by
Crindle and Russell, his Attys

United States Patent Office.

JAMES R. LITTLE, OF QUINCY, ILLINOIS, ASSIGNOR TO THE QUINCY METAL WHEEL COMPANY, OF SAME PLACE.

MECHANISM FOR THE MANUFACTURE OF METAL WHEELS.

SPECIFICATION forming part of Letters Patent No. 334,254, dated January 12, 1886.

Application filed October 19, 1885. Serial No. 180,344. (No model.)

*To all whom it may concern:*

Be it known that I, JAMES R. LITTLE, of Quincy, in the county of Adams, and in the State of Illinois, have invented certain Improvements in Mechanism for the Manufacture of Metal Wheels; and I do hereby declare that the following is a full, clear, and exact description thereof, reference being had to the accompanying drawings, in which—

Figure 1:
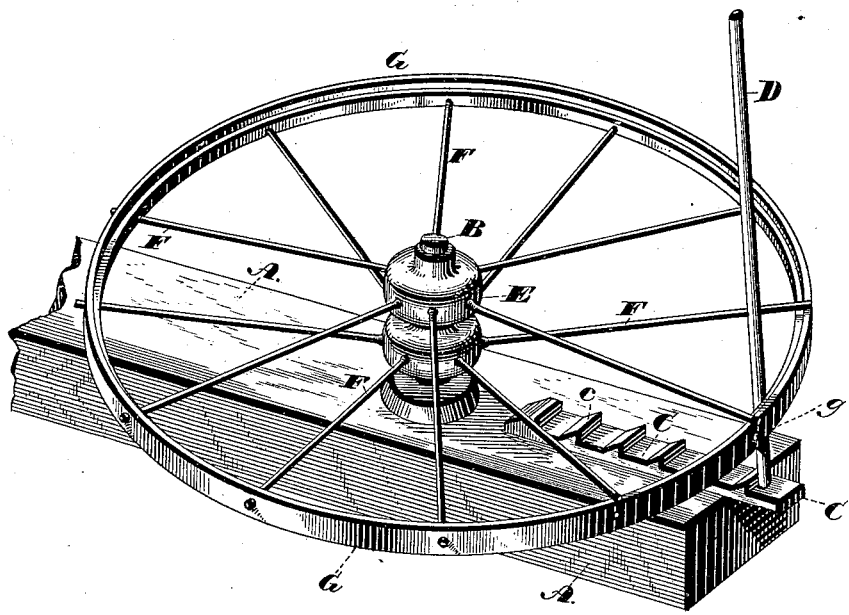
Figure 2:
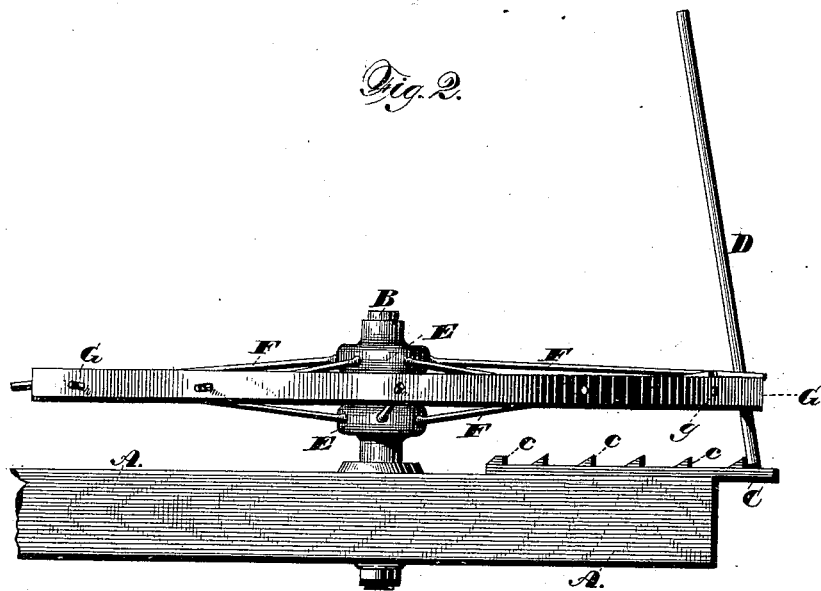

Figure 1 is a perspective view of my mechanism for use in combining the spider and rim of my wheel, and Fig. 2 is a side elevation of said machine.

Letters of like name and kind refer to similar parts in each of the figures.

My invention has for its object the construction of a metal wheel in which the hub and spokes are first united, and a solid mortised rim is then placed in position upon and united with the spokes; and to this end said invention consists, as a means for combining a wheel-spider with a solid mortised rim, in an apparatus in which are combined the following elements, to wit: A fixed journal-bearing upon which the hub of the wheel-spider may be journaled so as to be prevented from moving radially, a fulcrum that is secured to the frame of the apparatus at or near the point occupied by the outer ends of the spokes at one side of said spider, and a lever which is adapted to be placed against the inside of the wheel-rim, with one of its ends in engagement with said fulcrum, whereby when thus arranged an outward movement of the free end of said lever will operate to move said rim bodily in the same direction, substantially as and for the purpose hereinafter specified.

In the annexed drawings, A represents the bed plate or frame of my machine, from which extends upward a round arm, B, that has such size and longitudinal shape as to adapt it to receive and journal the hub of the wheel to be operated upon. Secured to the upper face of said frame is a bar or plate, C, that in a radial line is provided with steps or lugs c, each of which is adapted to be engaged by one end of a lever, D, that preferably has a length of about three feet.

The mechanism described is used as follows, viz: The hub E of a wheel, having secured within its mortises a series of equidistant spokes, F, is journaled upon the pivotal arm B, and a solid continuous tire or rim, G, provided with mortises g, which correspond in number and relative position to the number and position of said spokes, and have such diameter as to permit of the ready insertion of the ends of the same, is placed upon the said wheel-spider and the said mortises passed over the spokes at one side of said hub, after which the lever D is placed vertically against the inside of said rim, upon the side of said hub opposite to said engaged spokes, with its lower end in engagement with one of the lugs c, and its upper end then moved outward, so as to spring said rim at such point outward until the adjacent spoke F can be moved into line with its mortise g, when by releasing said rim from such outward pressure it will resume its normal position and said mortise will pass over said spoke. The wheel is now turned upon its axis until another disconnected spoke is in a line with the fulcrum-bar, and by the operation described said rim springs over said spoke, such operation being repeated until each spoke has its outer end contained within a mortise and the whole are ready to be fastened therein.

Having thus fully set forth the nature and merits of my invention, what I claim is—

As a means for combining a wheel-spider with a solid mortised rim, an apparatus in which are combined the following elements, to wit: a fixed journal-bearing upon which the hub of the wheel-spider may be journaled, so as to be prevented from moving radially, a fulcrum that is secured to the frame of the apparatus at or near the point occupied by the outer ends of the spokes at one side of said spider, and a lever which is adapted to be placed against the inside of the wheel-rim, with one of its ends in engagement with said fulcrum, whereby when thus arranged an outward movement of the free end of said lever will operate to move said rim bodily in the same direction, substantially as and for the purpose specified.

In testimony that I claim the foregoing I have hereunto set my hand this 26th day of September, 1885.

JAMES R. LITTLE.

Witnesses:
WM. H. BERRY,
S. A. BLASLAND.